United States Patent [19]

Hudson

[11] Patent Number: 5,200,443
[45] Date of Patent: Apr. 6, 1993

[54] RADIATION STABILIZED FABRIC HAVING IMPROVED ODOR CHARACTERISTICS CONTAINING AN HINDERED AMINE COMPOUND

[75] Inventor: Robert L. Hudson, Roswell, Ga.

[73] Assignee: Kimberly-Clark Corporation, Neenah, Wis.

[21] Appl. No.: 677,226

[22] Filed: Mar. 29, 1991

[51] Int. Cl.$^5$ .................................. C08K 5/3435
[52] U.S. Cl. ................................ 524/99; 524/102; 524/262; 524/265
[58] Field of Search ............... 524/102, 99, 262, 265; 428/224

[56] References Cited

U.S. PATENT DOCUMENTS

| | | | |
|---|---|---|---|
| 3,661,838 | 5/1972 | Enomoto | 424/416 |
| 3,688,985 | 9/1972 | Engel | 239/54 |
| 4,202,816 | 5/1980 | Moser et al. | 524/99 |
| 4,369,274 | 1/1983 | Thomas | 524/99 |
| 4,370,430 | 1/1983 | Hoffman | 524/99 |
| 4,377,651 | 3/1983 | Leininger | 524/102 |
| 4,413,096 | 11/1983 | Fu et al. | 524/102 |
| 4,507,415 | 3/1985 | Kasai et al. | 524/102 |
| 4,563,259 | 1/1986 | Rayner | 524/102 |
| 4,636,408 | 1/1987 | Anthony et al. | 524/102 |
| 4,668,721 | 5/1987 | Seltzer et al. | 524/100 |
| 4,749,734 | 6/1988 | Williams et al. | 524/102 |
| 4,774,275 | 9/1988 | Hisano et al. | 524/370 |
| 4,797,438 | 1/1989 | Kletecka et al. | 524/100 |
| 4,822,666 | 4/1989 | Hudson | 428/224 |
| 4,839,405 | 6/1989 | Speelman et al. | 524/95 |
| 4,857,595 | 8/1989 | Kazmierzak et al. | 525/142 |
| 4,859,759 | 8/1989 | Maycock et al. | 528/28 |
| 4,885,347 | 12/1989 | Myers | 525/447 |
| 4,895,901 | 1/1990 | Ramey et al. | 525/127 |
| 4,925,903 | 5/1990 | Myers | 526/204 |
| 4,948,888 | 8/1990 | Greco et al. | 544/69 |
| 4,959,402 | 9/1990 | Williams et al. | 524/99 |
| 4,965,301 | 10/1990 | Leininger | 524/101 |

FOREIGN PATENT DOCUMENTS

| | | |
|---|---|---|
| 389427 | 9/1990 | European Pat. Off. . |
| 389428 | 9/1990 | European Pat. Off. . |
| 389429 | 9/1990 | European Pat. Off. . |
| 389430 | 9/1990 | European Pat. Off. . |
| 389431 | 9/1990 | European Pat. Off. . |
| 389432 | 9/1990 | European Pat. Off. . |
| 389434 | 9/1990 | European Pat. Off. . |

*Primary Examiner*—Paul R. Michl
*Assistant Examiner*—Tae H. Yoon
*Attorney, Agent, or Firm*—William D. Herrick

[57] ABSTRACT

There is disclosed a radiation stabilized fabric of propylene polymer or copolymer of propylene which has improved odor characteristics. Radiation stabilization results from adding by weight 0.25 to 2.0 percent of an acetylated hindered amine light stabilizer known in the art as Cyasorb UV-3668 or by adding by weight 0.25 to 2.0 percent of an oligomeric, hindered amine substituted siloxane such as polymethyl propyl 3-oxy [4- (2, 2, 6, 6-tetramethyl) piperdinyl] siloxane.

14 Claims, No Drawings

RADIATION STABILIZED FABRIC HAVING IMPROVED ODOR CHARACTERISTICS CONTAINING A HINDERED AMINE COMPOUND

TECHNICAL FIELD

The present invention relates to radiation stabilized fabric, and more particularly relates to radiation stabilized polypropylene having improved odor characteristics.

BACKGROUND OF THE INVENTION

Disposable surgical fabrics for masks, gowns, drapes, towels, and the like are well-known in the art. In order for such fabrics to be acceptable in surgical environments, the fabrics should have good electrical conductivity to prevent static electricity build-up and associated sparking, alcohol repellency, strength, and long shelf-life. To sterilize garments made from such fabrics, it is known to seal the garments within plastic containers and subject the sealed containers to gamma or ionizing radiation. However, it is known that such radiation treatment detrimentally affects the above-enumerated physical properties as well as the odor characteristics of the material.

To avoid the detrimental effects of the radiation on the physical properties of the fabric, it is known to add radiation stabilizing agents to the fabric during manufacture. These stabilizing agents, however, typically do not inhibit the radiation treatment from imparting an offensive odor to the fabric. One example of a radiation treated fabric which has a reduced odor level compared to unstabilized and stabilized fabrics known in the art is disclosed in U.S. Pat. No. 4,822,666 (hereinafter "the '666 patent"), assigned to Kimberly-Clark Corporation, the assignee of the present invention and incorporated herein by reference. The '666 patent discloses fabrics stabilized using a long chain aliphatic ester of a 3,5-di-t-butyl-4-hydroxybenzoic acid. This stabilizer permits sterilization of the fabric using ionizing radiation without breakdown of the physical characteristics of the fabric such as conductivity, strength, and repellency. Experience has shown that fabrics treated in accordance with the '666 patent show a minimal strength loss during sterilization and in post-irradiation storage. These fabrics also have a reduced odor level as compared to unstabilized or typical stabilized fabrics known in the art. However, such fabrics still have an odor of a level which is sufficiently noticeable so as to desire improvement.

One attempt in the art to reduce the noticeable odor of fabrics treated in accordance with the '666 patent has been to further include an odor mask such as Polyiff 15086-00159 Baby Powder, available from International Flavors and Fragrances, Inc., Hazlet, N.J. The addition of such an odor mask has provided some improvement in the odor level, but such fabrics still have objectionable odor levels with a noticeable rise in odor level about a month after treatment. Therefore, a need exists for a disposable surgical fabric which may be sterilized with ionizing radiation without experiencing a loss of physical properties and without developing an objectionable odor.

SUMMARY OF THE INVENTION

The present invention solves the above described need by providing a disposable surgical fabric which may be sterilized by conventional ionizing radiation techniques without substantial degradation of its physical properties and without developing an objectionable odor.

Generally described, the present invention provides a radiation stabilized fabric comprising a nonwoven web formed of a propylene polymer containing an acetylated hindered amine light stabilizer.

More particularly, the present invention provides a radiation stabilized fabric comprising a nonwoven web formed of a propylene polymer containing Cyasorb UV-3668 stabilizer in an amount of between about 0.25 to 2.0 percent by weight of the web.

Another aspect of the present invention provides a radiation stabilized fabric comprising an nonwoven web formed of a propylene polymer containing an oligomeric, hindered amine substituted siloxane.

Still a more particular aspect of the present invention provides a radiation stabilized fabric comprising a nonwoven web formed of a propylene polymer containing polymethyl propyl 3-oxy [4-(2, 2, 6, 6-tetramethyl) piperidinyl] siloxane in an amount of between about 0.25 to 2.0 percent by weight of the web.

Accordingly, an object of the present invention is to provide a radiation stabilized polypropylene or propylene copolymer which has been stabilized against the undesirable effects of ionizing radiation and which does not have an offensive odor.

A further object of the present invention is to provide a radiation stabilized fabric which will maintain, without offensive odor, at least 70% of its initial tensile strength after treatment with ionizing radiation sufficient to sterilize the fabric and after aging.

It is also an object of the present invention to provide a surgical fabric which can be sterilized by gamma radiation without having a resulting offensive odor and without losing its strength, conductivity and alcohol repellency.

Other objects, features, and advantages of the present invention will become apparent upon reading the following detailed description of embodiments of the invention, when taken in conjunction with the appended claims.

DETAILED DESCRIPTION OF THE INVENTION

A surgical fabric made from polypropylene or a propylene-ethylene copolymer may be stabilized against the harmful effects of ionizing radiation to the physical properties and odor characteristics of the fabric by adding either an acetylated hindered amine light stabilizer or an oligomeric, hindered amine substituted siloxane to the polymer prior to forming the surgical fabric. In one application, the stabilized surgical fabric consists of a laminate of a melt-blown layer of polypropylene fabric sandwiched between two outside layers of spun-bonded polypropylene. The spun-bonded layers may be prepared in accordance with the processes illustrated by the following patents: Dorschner et al. U.S. Pat. No. 3,692,618; Kinney U.S. Pat. Nos. 3,338,992 and 3,341,394; Levy U.S. Pat. No. 3,502,538; Harmann U.S. Pat. Nos. 3,502,763 and 3,909,009; Dobo, et al. U.S. Pat. No. 3,542,615; Morman et al. U.S. Pat. No. 4,405,297; and Harmon Canadian Patent. No. 803,714. Spun-bonded materials prepared with continuous filaments generally have at least three common features. First, the polymer is continuously extruded through a spinneret to form discrete filaments. Thereafter, the filaments are drawn either mechanically or pneumatically without breaking in order to molecularly orient the polymer filaments and achieve tenacity. Lastly, the continuous filaments are deposited in a substantially random manner onto the carrier belt to form the web.

The melt-blown interior layer is also conventional and its construction is illustrated by NRL Report 4364, "Manufacture of Super-fine Organic Fibers", by V. A. Wendt, E. L. Boon, and C. D. Fluharty; NRL Report 5265, "An Improved Device for the Formation of Super-Fine Thermoplastic Fibers", by K. D. Lwrence, R. T. Lukas, and J. A. Young; and U.S. Pat. No. 3,849,241, issued Nov. 19, 1974, to Buntin, et al.

A surgical fabric consisting of a melt-blown web sandwiched between spun-bonded webs of polypropylene or propylene copolymers can be made in accordance with Brock et al. U.S. Pat. No. 4,041,203 for "Nonwoven Thermoplastic Fabric." Such a fabric is manufactured by Kimberly-Clark Corporation and is used in health care products sold under the trade-mark SPUNGUARD. For such a surgical fabric, it is customary to treat the nonwoven polypropylene or copolymer web with a surface treatment to provide alcohol repellency and enhance conductivity and hereby inhibit the build up of static electricity. In order to achieve alcohol repellency and electrical conductivity a doctor roll is used to apply a mixture comprised by weight of about 2.15 percent of a polymeric fluorocarbon, 0.09 percent lithium nitrate, 0.07 percent hexanol, and 97.06 percent water to the surface of the fabric. The polymeric fluorocarbon is 3M FC808 manufactured by 3M Company, St. Paul, Minn. The treatment results in a dry add on weight (as a percentage of the web weight) of 0.3 percent for the polymeric fluorocarbon and of 0.03 percent for the lithium nitrate. Such treatment is further described in Hultman et al. U.S. Pat. No. 4,111,605.

As previously discussed, the surgical fabric is made into surgical products which are sealed in plastic containers and subjected to ionizing radiation in order to render the fabric sterile. Polypropylene and copolymers of propylene, including propylene-ethylene copolymers, are adversely affected by the radiation and lose strength, conductivity and repellency, and develop an objectionable odor.

Early attempts at stabilizing polypropylene and its copolymers focused on hindered amine light stabilizers. While hindered amine light stabilizers, such as Chimassorb 944 stabilizer manufactured by Ciba Geigy Corporation, Hawthorne, N.Y., provide some improvement in stabilization against degradation and strength, they unfortunately cause a loss of conductivity and repellency properties. So hindered amine light stabilizers, such as Hostavin TMN 20 stabilizer manufactured by American Hoescht Corporation, Somerville, N.J., react with the water repellency treatment to form an objectionable nitrate salt deposit on the surgical fabric.

It has been discovered, however, that polypropylene and copolymers of propylene may be stabilized by using an acetylated hindered amine light stabilizer and thereby retain substantially all of the physical properties of the fabric without developing an objectionable odor. The particular stabilizer which has been utilized with success is sold under the trademark Cyasorb UV-3668 stabilizer and manufactured by American Cyanamid Company, Wayne, N.J. In order to achieve the best results, the Cyasorb UV-3668 stabilizer should be added to the polymer or copolymer in amounts ranging from 0.25 to 2.0 percent by weight of the web prior to forming the web. Cyasorb UV-3668 stabilizer has a molecular weight of 449, with a formula of:

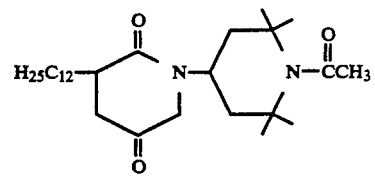

Alternatively, it has also been discovered that similar results may be obtained by using an oligomeric, hindered amine substituted siloxane as a stabilizer. Particularly, such a siloxane is polymethyl propyl 3-oxy [4-(2, 2, 6,6-tetramethyl) piperidinyl] siloxane which is sold under the trademark Uvasil-299 and manufactured by Enichem Americas Inc., New York, N.Y. In order to achieve best results, the Uvasil-299 should be added to the polymer or copolymer in amounts ranging from 0.25 to 2.0 percent by weight prior to forming the web. It will be understood that the stabilizers of the present invention may be added to the fabric as described in Example 2 of the '666 patent, from which the Cyasorb-2908 has been omitted.

Odor tests were performed which compared the odor of fabrics having the stabilizers of the present invention to fabric having the stabilizer of the '666 patent (sample 766) and to unstabilized fabric (sample 867). The fabrics tested were spunbond fabrics formed utilizing standard manufacturing methods. The test results are shown in Table 1.

TABLE 1

| Sample | Composition | Odor Rating |
|---|---|---|
| 867 | Exxon 3435 RG | 4.5 |
| 766 | Exxon 3435 RG with 2.0% SCC 5065 by weight of the fabric and 1.0% Cyasorb UV-2908 stabilizer by weight of the fabric | 2.9 |
| 842 | Exxon 3435 RG with 2% SCC 5065 by weight of the fabric and 1.0% Cyasorb UV-3668 stabilizer by weight of the fabric | 1.7 |
| 841 | Exxon 3435 RG with 2% SCC 5065 by weight of the fabric and 1.0% Uvasil-299 stabilizer by weight of the fabric | 1.1 |

Exxon 3435 RG is a polypropylene resin available from Exxon Company U.S.A., Houston, Tex.

SCC 5065 in a neutralizing agent (calcium stearate) available from Standridge Color Corporation, Social Circle, Ga. SCC 5065 has no effect on odor.

Odor rating was a subjective test carried out by panels who rated the odor level from 0 (no odor) to 6 (strong odor).

The foregoing description relates to preferred embodiments of the present invention, and modifications or alterations may be made without departing from the spirit and scope of the invention as defined in the following claims.

I claim:

1. An ionizing radiation stabilized fabric comprising a nonwoven web formed of a propylene polymer containing an acetylated hindered amine light stabilizer having a formula of:

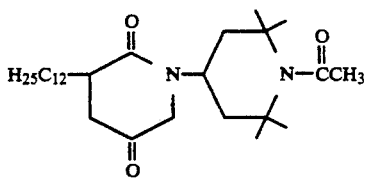

2. The fabric of claim 1, wherein the acetylated hindered amine light stabilizer has a molecular weight of 449.

3. The fabric of claim 1, wherein the propylene polymer is polypropylene.

4. The fabric of claim 1, wherein the propylene polymer is a propylene-ethylene copolymer.

5. The fabric of claim 1 wherein the acetylated hindered amine light stabilizer is present in the web in an amount of between about 0.25 to 2.0 percent by weight of the web.

6. The fabric of claim 2 wherein the acetylated hindered amine light stabilizer is present in the web in an amount of between about 0.25 to 2.0 percent by weight of the web.

7. The fabric of claim 3 wherein the acetylated hindered amine light stabilizer is present in the web in an amount of between about 0.25 to 2.0 percent by weight of the web.

8. The fabric of claim 4 wherein the acetylated hindered amine light stabilizer is present in the web in an amount of between about 0.25 to 2.0 percent by weight of the web.

9. An ionizing radiation stabilized fabric having improved odor characteristics comprising a nonwoven web formed of a propylene polymer containing polymethyl propyl 3-oxy siloxane.

10. The fabric of claim 9, wherein the propylene polymer is polypropylene.

11. The fabric of claim 9, wherein the propylene polymer is a propylene-ethylene copolymer.

12. The fabric of claim 9 wherein the siloxane is present in the web in an amount of between about 0.25 to 2.0 percent by weight of the web.

13. The fabric of claim 10 wherein the siloxane is present in the web in an amount of between about 0.25 to 2.0 percent by weight of the web.

14. The fabric of claim 11 wherein the siloxane is present in the web in an amount of between about 0.25 to 2.0 percent by weight of the web.

* * * * *

UNITED STATES PATENT AND TRADEMARK OFFICE
CERTIFICATE OF CORRECTION

PATENT NO. : 5,200,443

DATED : April 6, 1993

INVENTOR(S) : R. L. Hudson

It is certified that error appears in the above-indentified patent and that said Letters Patent is hereby corrected as shown below:

Column 2, line 62, "Harmann U.S. Pat. Nos." should read --;Hartmann U.S. Pat. Nos.--.

Column 3, line 25, "conductivity and hereby inhibit" should read --conductivity and thereby inhibit--.

Column 3, line 53, "So hindered amine" should read --Some hindered amine--.

UNITED STATES PATENT AND TRADEMARK OFFICE
CERTIFICATE OF CORRECTION

PATENT NO. : 5,200,443
DATED : April 6, 1993
INVENTOR(S) : R. L. Hudson

It is certified that error appears in the above-indentified patent and that said Letters Patent is hereby corrected as shown below:

Column 4, lines 5-12, " 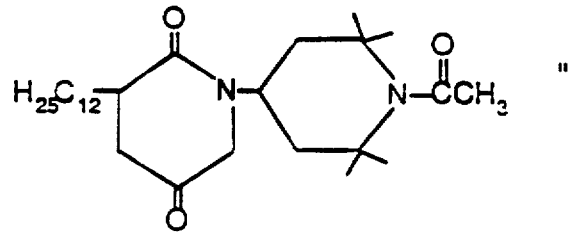 "

should read -- 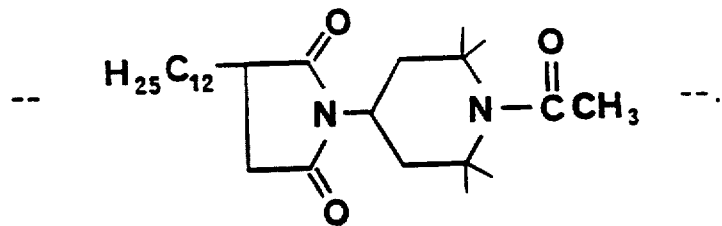 --.

Column 4, line 24, "It will be understood" should read --(new paragraph) It will be understood--.

UNITED STATES PATENT AND TRADEMARK OFFICE
CERTIFICATE OF CORRECTION

PATENT NO. : 5,200,443
DATED : April 6, 1993
INVENTOR(S) : R. L. Hudson

Page 3 of 4

It is certified that error appears in the above-indentified patent and that said Letters Patent is hereby corrected as shown below:

Column 5, lines 1-9, "   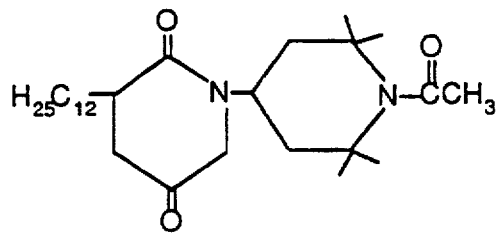   "

should read    --   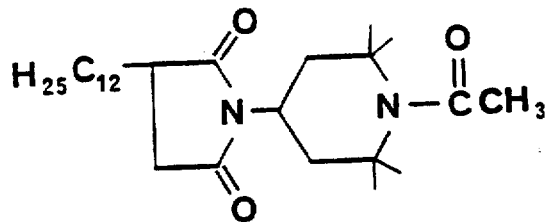   --.

UNITED STATES PATENT AND TRADEMARK OFFICE
CERTIFICATE OF CORRECTION

PATENT NO. : 5,200,443
DATED : April 6, 1993
INVENTOR(S) : R. L. Hudson

It is certified that error appears in the above-indentified patent and that said Letters Patent is hereby corrected as shown below:

Column 6, line 12, "3-oxy siloxane." should read --3-oxy[4-(2,2,6,6-tetramethyl)]piperdinyl Siloxane--.

Signed and Sealed this

Eighteenth Day of October, 1994

Attest:

BRUCE LEHMAN

Attesting Officer     Commissioner of Patents and Trademarks